Dec. 15, 1936.  H. HERRMANN  2,064,472
APPARATUS FOR MAKING PHOTOGRAPHIC EXPOSURES
Filed June 12, 1931  3 Sheets-Sheet 1

Inventor:
Heinrich Herrmann
by Edward H. Palmer
Atty.

Dec. 15, 1936.  H. HERRMANN  2,064,472
APPARATUS FOR MAKING PHOTOGRAPHIC EXPOSURES
Filed June 12, 1931  3 Sheets-Sheet 2

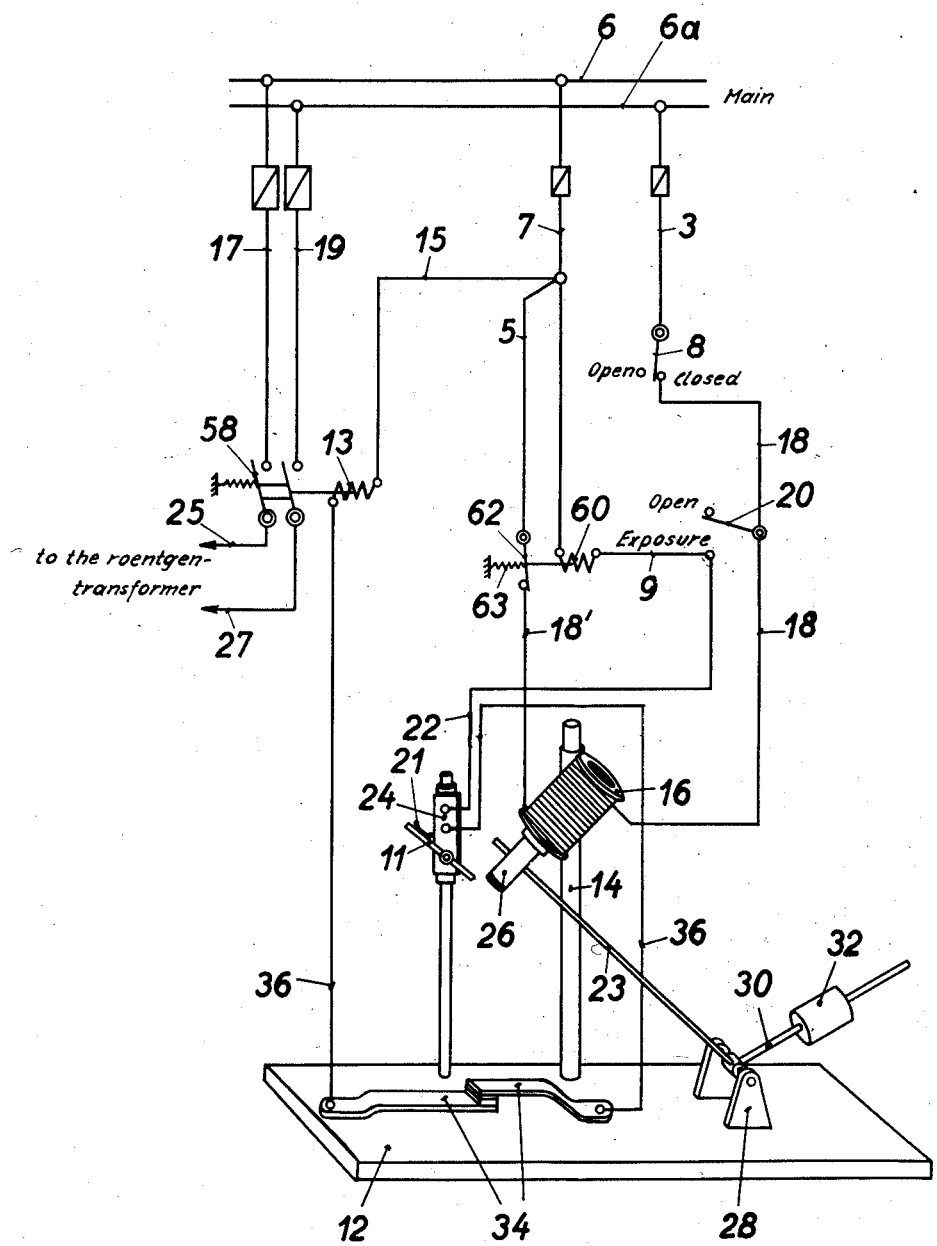
Fig: 3

Patented Dec. 15, 1936

2,064,472

UNITED STATES PATENT OFFICE 2,064,472

APPARATUS FOR MAKING PHOTOGRAPHIC EXPOSURES

Heinrich Herrmann, Berlin-Wannsee, Germany, assignor to Elektricitatsgesellschaft "Sanitas", Berlin, Germany, a corporation of Germany Application June 12, 1931, Serial No. 543,953
In Germany June 16, 1930

12 Claims. (Cl. 250—34)

This invention relates to apparatus for making photographic exposures, and more particularly Röntgen-ray exposures of short duration.

The invention and its aims and objects will be clearly understood from the following description, taken in connection with the accompanying drawings, of illustrative embodiments of the invention, the true scope of the invention being more particularly pointed out in the appended claims.

In the drawings:

Fig. 3 shows diagrammatically, upon an enlarged scale, the instrumentalities of the embodiment of the invention shown in Fig. 1, with the circuit connections.

In making Röntgen-ray photographs of moving organs, it is aimed to secure a picture of one phase of movement of the organ. In making photographs of the heart, lungs, stomach, etc., an exposure of only a few hundredths of a second is required for this purpose. As in order to secure a softness of exposure it is necessary to keep the tube voltage as low as possible, the necessary ray intensity can be secured only by increasing the strength of the tube current. The Röntgen-ray tubes must therefore be utilized close to the limit of their load capacity, which however, will only be possible on condition that the exposure clock, which switches on the high tension current for the exposure and then switches it off again upon expiration of the predetermined time of exposure, shall be reliable and constant in operation. In the case of Röntgen-ray photography the soft ray technic stands or falls with the excellence of the exposure clock. Should the exposure clock fail in switching off the high tension current, or should there be delay, the resultant overloading of the Röntgen-ray tube may cause its destruction. The consequent damage is considerable, as for these exposures high efficiency tubes, in some cases provided with rotary anodes, are used.

So far as I am aware, no exposure clock heretofore used has met the requirements of absolute reliability and constancy in operation for short exposures. One of the aims of the present invention is to provide apparatus that shall meet these requirements.

Figure 1:
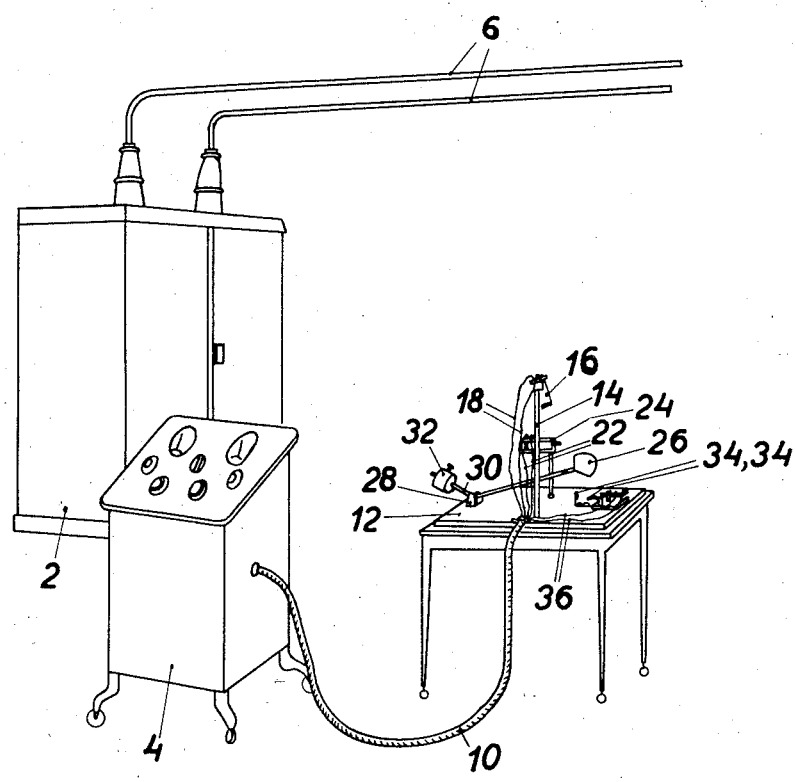
Fig. 1 is a diagrammatic view of Röntgen-ray apparatus embodying one illustrative form of the invention.

Referring to Fig. 1, I have therein shown a transformer cabinet 2 and a switch-board 4, both of which may be of conventional construction and need not be more fully described. The transformer for the Röntgen-ray circuit receives its current from a source of energy of any suitable type (not shown) through main conductors 6, 6a, conductors 17, 19, double pole switch 58 and conductors 25, 27. The switches on the switch board 4 and apparatus for controlling the exposure receive current, preferably from the same conventional source of energy, through suitable conductors 3 and 7 leading from main conductors 6, 6a as hereinafter more fully described. A main supply switch is diagrammatically represented at 8 in Figs. 2 and 3.

A cable 10 containing the necessary conductors mentioned, leads from the switch-board 4 to a plate 12 to which its free end is firmly secured in any suitable manner. The plate may rest upon a table or other suitable support. A standard 14 rises from said plate 12 and has secured to its upper end an electromagnet 16. The armature of said magnet comprises gravity actuated means, herein comprising a hammer 26 having its supporting arm 23 fulcrumed at 28 on said plate 12 and having a rearwardly extending arm 30 carrying a weight 32 adjustable longitudinally thereof. When said magnet is energized, the hammer 26 will be held in raised position but will drop when said magnet is de-energized. Within the path of movement of said hammer are two sets of contacts 24 and 34 adapted to be operated by said hammer as it drops by gravity.

The principal circuits, besides the transformer circuits above mentioned, are as follows: (1) From main 6a through conductor 3, switch 8, conductor 18, coil of magnet 16, conductor 18', switch 62 and conductors 5 and 7 to main conductor 6. (2) From main 6a to conductor 3, switch 8, conductor 18, switch 20, conductor 9, relay 60 and conductor 7 to main conductor 6. (3) From main conductor 6a through conductor 3, switch 8, conductor 18, switch 20, conductor 22, contacts 24, pivotally mounted spring contact 11, 21, conductor 36, contacts 34, conductor 36, relay 13, conductors 15 and 7 to main conductor 6.

In the operation of the illustrative embodiment of the invention shown in Figs. 1 and 3, switches 58, 8, 20 and 24 will be open and switch 62 and spring closed contacts 34 will be closed. Under these conditions current will be cut off from the Röntgen-ray transformer and from the magnet 16. If armature 26 be now brought into operative relation with magnet 16 and the main switch 8 be closed, as shown in Fig. 3, said magnet 16 will be energized through circuit (1) above and hammer 26 will be held in raised position. If now operating switch 20 be closed, i. e., moved from "open" to "exposure" position, Fig. 3, relay 60 will be energized through circuit (2) above, and will open switch 62 against the action of spring 63, thus deenergizing magnet 16 and allowing hammer 26 to drop by gravity about its fulcrum 28. In dropping said hammer first strikes pivoted switch arm 11 and swings spring contact 21 thereon into contact with contacts 24, said spring contact 21 clamping said contacts 24 and through circuit (3) above energizing relay 13 and closing double pole switch 58, thereby supplying current to the Röntgen transformer so that the Röntgen-ray tube receives high tension current until, as it continues to fall, said hammer strikes the spring closed contacts 34—34 which it opens, thus breaking said circuit (3) and cutting off the high tension current. The time the hammer takes to fall from contacts 24 to contacts 34 represents the time of exposure. The time of exposure may be varied or adjusted as desired by vertical adjustment of the contacts 24 relative to the contacts 34, or by adjustment of the weight 32 longitudinally of the arm 30, or of height of magnet.

Figure 2:
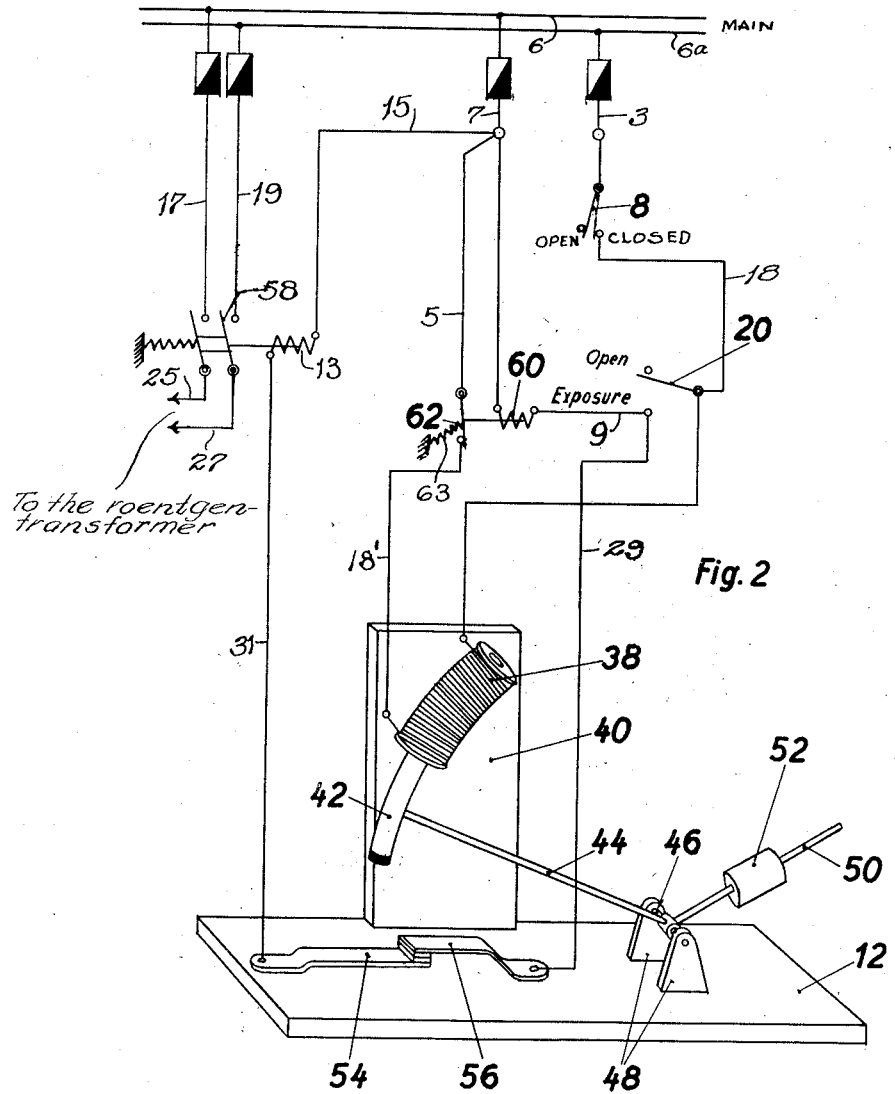
Fig. 2 is a diagrammatic view of an illustrative embodiment of the invention comprising certain modifications.

Referring to Fig. 2, a solenoid 38 is suitably mounted upon a support 40 rising from the plate 12. The gravity actuated means comprises the iron core 42 of said solenoid, which is carried by an arm 44 secured to a shaft 46 journaled in brackets 48 fixed on said plate 12. Said shaft 46 carries a rearwardly projecting arm 50 provided with a weight 52 adjustable longitudinally thereof.

The transformer for the Röntgen-ray tube receives its current from main conductors 6, 6a through conductors 17, 19, double pole switch 58 and conductors 25, 27.

The other circuits in this embodiment of the invention are as follows: (1) From main conductor 6a to conductor 3, main switch 8, conductors 18, winding of magnet 38, conductor 18', switch 62, and conductors 5 and 7 to main conductor 6. (2) From main 6a to conductor 3, switch 8, conductor 18, switch 20, conductor 9, relay 60 and conductors 7 to main 6. (3) From main conductor 6a through conductor 3, switch 8, conductor 18, switch 20, conductor 29, spring closed contacts 52, 56, conductor 31, relay 13 and conductors 15 and 7 to main conductor 6.

Referring to said Fig. 2 the operating switch 20 will normally be open, circuits (2) and (3) will be broken and relays 60 and 13 will be de-energized so that switch 62 in circuit (1) will be closed. Similarly the double pole switch 58 will be open and the high tension current for the exposure will thus be cut off. If the main supply switch 8 now be closed, only the circuit (1) will be closed, thus energizing the solenoid and the hammer 42 will be maintained in raised position. If now the operating switch 20 be moved from "open" to "exposure" position, the circuit of the double pole switch 58 will be closed by energizing of relay 13 through circuit (3) above and the Röntgen-ray tube will receive high tension current and the relay or magnet 60 will be energized through circuit (2) above to open switch 62 and break the solenoid circuit and deenergize the latter. This breaking of the solenoid circuit, however, releases the hammer 42 which falls and, striking the normally spring closed contacts 54—56, breaks the circuit of the two pole switch and throws out the high tension current. On moving the operating switch 20 back to "open" position, the solenoid circuit will be closed and the hammer 42 will be drawn upwardly into operative position, preparatory to making another exposure.

It will be apparent to those skilled in the art that my invention possesses many advantages over apparatus heretofore used for the same purpose. It is founded upon the laws of falling bodies than which nothing is more reliable and constant, so that there is no danger whatever of failure in throwing the current in and out. Its accuracy and reliability and constancy in operation are beyond question. The construction of Fig. 2 possesses the additional advantages that the necessity of returning the hammer to operative position and resetting of the contacts after each exposure are avoided. A simple movement of the switch 20 restores the hammer to operative position and all is ready for another exposure. The delay thus avoided is a great advantage in making exposures in series as is so frequently done today.

The speed with which the hammer drops and therefore the duration of the exposure may be varied in the construction of Fig. 2 as in that of Fig. 1, preferably by adjustment of the weight 52.

I am aware that the invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

I claim:

1. Apparatus for making radiographs comprising, in combination, gravity responsive means; electrically energizable means to maintain said gravity responsive means in raised position; a Röntgen-ray tube high tension circuit; means to de-energize said electrically energizable means and allow said gravity responsive means to drop; and first and second contact means vertically spaced from each other and operated by said gravity responsive means as it drops by gravity, the first to close and the second to break said high tension circuit.

2. Apparatus for making radiographs comprising, in combination, gravity responsive means; electrically energizable means to maintain said gravity responsive means in raised position; a Röntgen-ray tube high tension circuit; means to de-energize said electrically energizable means and allow said gravity responsive means to drop by gravity; first and second contact means vertically spaced from each other and operated by said gravity responsive means as it drops by gravity, the first to close and the second to break said high tension circuit; and means to vary the time elapsing between the operation by said gravity responsive means of said first and second contacts.

3. Apparatus for making radiographs comprising, in combination, gravity responsive means; electrically energizable means to maintain said gravity responsive means in raised position; a circuit including said electrically energizable means; a switch in said circuit; a second circuit including a relay to operate said switch to open the first named circuit; means to be energized, including a Röntgen-ray tube transformer primary circuit having a switch to open and close the same; a fourth circuit containing a relay to operate said last named switch; means normally closing said fourth circuit and vertically spaced from said electrically energizable means and operated by said gravity responsive means as it drops by gravity to break said fourth circuit; and a switch common to said second and fourth circuits to simultaneously cause the de-energization of said electrically energizable means and to cause the energization of the Röntgen-ray tube.

4. Apparatus for making radiographs comprising, in combination, gravity responsive means; electrically energizable means to maintain said gravity responsive means in raised position; a circuit including said electrically energizable means; a switch in said circuit; a second circuit including a part of the first mentioned circuit and having a relay to operate said switch to open the first named circuit; means to be energized, including a Röntgen-ray transformer primary circuit having a switch to open and close the same; a fourth circuit, including a part of said second circuit containing a relay to operate said last named switch; means in the fourth circuit normally closing said circuit and vertically spaced from said electrically energizable means and operated by said gravity responsive means as it drops by gravity to break said fourth circuit; a switch in said second circuit and a switch in said fourth circuit to cause the deenergization of said electrically energizable means and to cause the energization of the Röntgen-ray tube; and adjustable means associated with said gravity responsive means to vary the time elapsing between the deenergization of said electrically energizable means and the breaking of said fourth circuit by said gravity responsive means.

5. Apparatus for making radiographs comprising, in combination, a solenoid having its core fulcrumed for swinging movement in a vertical plane; an energizing circuit for said solenoid containing a normally closed relay controlled switch; means to be energized including a Röntgen-ray tube transformer primary circuit; a normally open relay controlled switch to connect said circuit with a source of electric energy; a circuit containing normally closed contact means adapted to be opened by said solenoid, when it is de-energized and a relay for controlling said last mentioned controlled switch; a circuit including a relay for controlling said first mentioned controlled switch; and an operating switch common to said last named circuits, whereby closure of said operating switch will energize said relays simultaneously to connect said transformer circuit with its source of energy to supply current to the Röntgen-ray tube and break said solenoid energizing circuit to cause said solenoid core to drop by gravity and break said contact means to cut off the high tension current from the Röntgen-ray tube.

6. Apparatus for making photographic exposures, more particularly radiographs, comprising in combination, means to be energized, including an X-ray tube transformer primary circuit; a switch to control said circuit; a timing member freely responsive to gravity; operating means for said switch; means to maintain said timing member in raised position; a second circuit including said last mentioned means; a switch in said second circuit; manual means associated with said operating means connected for simultaneously effecting the actuation of said switch operating means to close the X-ray tube primary transformer circuit and said last mentioned switch to cause the release of said gravity timing member by said maintaining means; and means spaced from said means for maintaining said timing member in raised position and operative by said timing member as it drops by gravity to cause said switch operating means to open the switch and de-energize the X-ray tube circuit.

7. Apparatus for making photographic exposures, more particularly radiographs, comprising in combination, means to be energized, including an X-ray tube transformer primary circuit; a switch to control said circuit; a timing member freely responsive to gravity; operating means for said switch; means to maintain said timing member in raised position; a second circuit including said last mentioned means; a switch in said second circuit; means associated with the operating means for simultaneously actuating said switch operating means to close the X-ray tube primary transformer circuit and said last mentioned switch to cause the release of said gravity timing member by said maintaining means; means spaced from said means for maintaining said timing member in raised position and operated by said timing member as it drops by gravity to cause said switch operating means to open the switch and de-energize the X-ray tube circuit; and means coacting with said timing member to vary the time elapsing between the closing of said exposure circuit controlling switch and the operation by said timing member of said exposure terminating means.

8. Apparatus for making photographic exposures, more particularly radiographs, comprising in combination, means to be energized, including an X-ray tube transformer primary circuit; a switch to control said circuit; operating means therefor; a timing member freely responsive to gravity; means to raise said timing member to maintain said timing member in raised position; a second circuit including said last mentioned means; a switch in said second circuit; means associated with said operating means for simultaneously effecting the actuation of said switch operating means to close the X-ray tube primary transformer circuit and said last mentioned switch to cause the release of said gravity timing member by said maintaining means; operating means associated with said timing member to close said second named switch; and means spaced from said means for maintaining said timing member in raised position and operated by said timing member as it drops by gravity to cause said switch operating means to open the switch and de-energize the X-ray tube circuit.

9. X-ray apparatus comprising, in combination, an X-ray tube transformer primary circuit having a normally open controlling switch; actuating means connected to close said controlling switch and start an exposure; means freely responsive to gravity connected to effect timed energization and deenergization of said actuating means; means for normally maintaining said gravity responsive means in raised position; and an operating switch connected to release said maintaining means.

10. X-ray apparatus comprising, in combination, an X-ray tube transformer primary circuit having a normally open controlling switch; a circuit including a relay which, when energized, will close said controlling switch and start an exposure; means freely responsive to gravity connected to close and open said circuit in timed sequence, thereby energizing and deenergizing said relay; means for normally maintaining said gravity responsive means in raised position; and an operating switch connected to release said maintaining means.

11. X-ray apparatus comprising, in combination, an X-ray tube transformer primary circuit having a normally open controlling switch; energizable means connected to close said controlling switch; a solenoid having a drop-out armature so connected that, as it falls, it effects energization and deenergization of said energizable means to start and terminate an exposure; an energizing circuit for said solenoid having a normally closed switch whereby the armature is maintained in raised position; an operating switch; and means actuated by closure of said operating switch to open said solenoid circuit and permit the armature to drop.

12. X-ray apparatus comprising, in combination, an X-ray tube transformer primary circuit having a normally open controlling switch; a circuit including a relay which, when energized, will close said controlling switch and start an exposure; an operating switch in said relay circuit, a solenoid having a drop-out armature so connected that, as it falls, it opens said circuit to effect deenergization of said relay after a predetermined time interval; an energizing circuit for said solenoid having a normally closed switch whereby the armature is maintained in raised position; and means operable by closure of said operating switch to open said switch in the solenoid energizing circuit and permit the armature to drop.

HEINRICH HERRMANN.